W. W. KARRO.
CANE.
APPLICATION FILED OCT. 3, 1919.

1,347,382. Patented July 20, 1920.

Witnesses
Fredk L Fox

Inventor
William W. Karro
By Victor J. Evans.
Attorney

UNITED STATES PATENT OFFICE.

WILLIAM W. KARRO, OF GREAT NECK, NEW YORK.

CANE.

1,347,382.      Specification of Letters Patent.      Patented July 20, 1920.

Application filed October 3, 1919. Serial No. 328,188.

*To all whom it may concern:*

Be it known that I, WILLIAM W. KARRO, residing at Great Neck, in the county of Nassau and State of New York, have invented new and useful Improvements in Canes, of which the following is a specification.

This invention relates to toys, and has for its primary object the provision of a cane or wand equipped with an electro-magnet at one end, which when energized, adapts the cane for use in attracting and moving metallic wheeled toys over the ground or surface.

The invention will be better understood when the following detail description is taken in connection with the accompanying drawings, the invention residing in the construction, combination and arrangement of parts as claimed.

In the drawings forming part of this specification, like numerals of reference indicate similar parts in the several views and wherein:—

Figure 1:
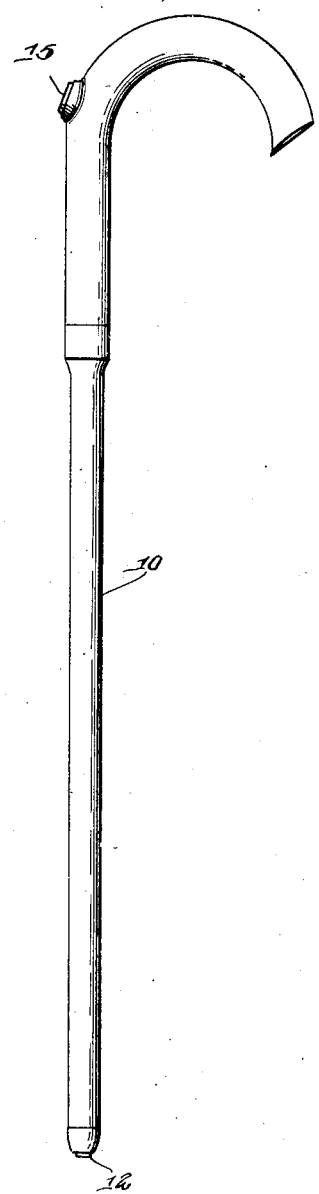
Figure 1 is a view of the cane or wand in elevation.
Figure 2:
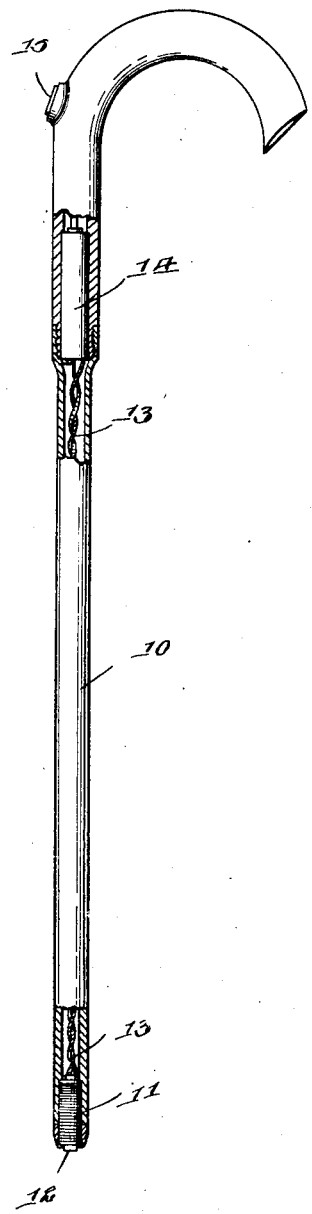
Fig. 2 is a longitudinal sectional view therethrough.

Referring to the drawing in detail, 10 indicates a cane, wand or the like which is of proper size to be conveniently handled by children, and may be constructed from any suitable material and of desired configuration for the purpose intended.

Embedded in the cane adjacent one end is an electromagnet 11 exposed at the lower end of the cane as at 12. Passed through the cane are suitable wires 13 connecting the magnet 11 with the battery 14. A switch of any suitable construction is connected in circuit and is arranged upon the cane in convenient reach of the user, the switch being indicated at 15. A cane or wand constructed in this manner will provide considerable amusement for young children, inasmuch as the device may be used for attracting and leading wheeled toys over the ground or surface or may be utilized for picking metal articles off the ground. In use, the switch 15 is actuated to energize the electromagnet 11, and by reason of the fact that this magnet is exposed from one end of the cane, it can be conveniently handled for the purpose intended.

While I have shown and described what I consider the preferred embodiment of the invention, I desire to have it understood that I do not limit myself in this connection, in that such changes may be resorted to when desired as fall within the scope of what is claimed.

Having thus described my invention what I claim as new is:—

1. A toy comprising a cane or wand, an electro-magnet embedded in the cane and having one end exposed, a battery mounted within the cane adjacent the handle thereof, wires connecting the magnet and battery and a switch connected in circuit with said parts and disposed in convenient reach of the user for the purpose specified.

2. A toy comprising a cane or wand, a battery carried by the cane, an electro-magnet embedded in the cane, and disposed upon the lower end thereof, wires connecting the battery and magnet, and a switch including the circuit and disposed in convenient reach of the fingers of the user.

In testimony whereof I affix my signature.

WILLIAM W. KARRO.